June 26, 1962  D. B. PECK ETAL  3,041,511

MULTILAYER THIN FILM CAPACITOR

Filed Sept. 6, 1955

M. MARKARIAN &
D. B. PECK
　　　INVENTORS

BY

*Connolly and Hutz*

THEIR ATTORNEYS

Patented June 26, 1962

3,041,511
MULTILAYER THIN FILM CAPACITOR
David B. Peck and Moushy Markarian, Williamstown, Mass., assignors to Sprague Electric Company, North Adams, Mass., a corporation of Massachusetts
Filed Sept. 6, 1955, Ser. No. 532,726
1 Claim. (Cl. 317—242)

The present invention relates to electrical capacitors that are of particularly small size. This application is a continuation-in-part of application Serial No. 479,832, filed January 4, 1955.

Among the objects of the present invention is the provision of capacitors that are not only of miniature size, but provide an appreciable capacitance.

Additional objects of the present invention include the provision of novel techniques for making compact capacitors of the above type.

Figure 1:
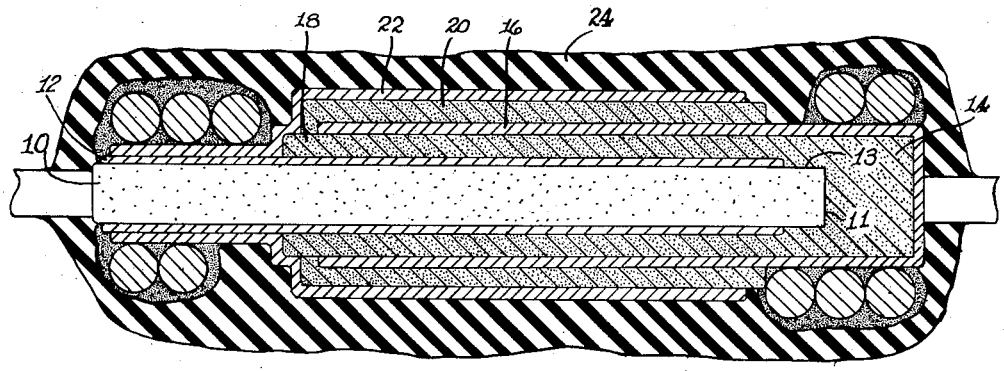
Figure 2:
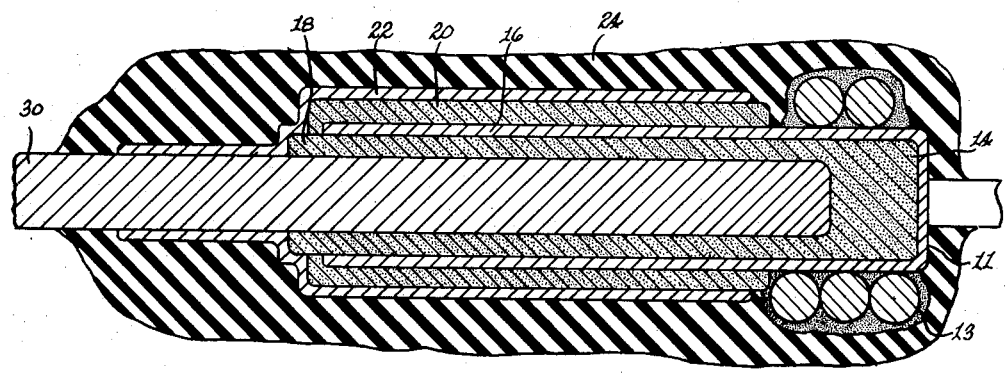

These, as well as still further objects of the present invention, will be more clearly understood from the following description of several of its exemplifications, reference being made to the accompanying drawings wherein:

FIG. 1 is a sectional view of a compact capacitor embodying the present invention; and FIG. 2 is a similar view of a modified form of capacitor representative of this invention.

According to the present invention, a very desirable form of miniature capacitor has an elongated self-supporting body not over ⅛ inch thick with an electrically conductive surface, a first high dielectric constant ceramic coating not more than 5 mils thick adherently enveloped about said surface, a film of conductive material less than ½ mil thick adhered to the outer surface of the coating, a second coating of high dielectric constant ceramic not more than 5 mils thick adherently enveloped about the conductive film, and a film of conductive material not more than one mil thick about the second coating.

Very effective forms of thin dielectric constant ceramic coatings are provided by dipping the self-supporting body in an aqueous suspension of precalcined titanate particles, withdrawing the dipped body with a thin coating of the suspended particles from the suspension, and drying and firing the withdrawn body to sinter the coating particles into a substantially uniform dielectric film.

FIGS. 1 and 2 show compact capacitors of the present invention considerably enlarged and distorted as to scale in the interest of clarity. In FIG. 1 the capacitor is built around a self-supporting elongated rod 10 of ceramic material such as steatite, porcelain, silica, alundum, zirconia, zircon or the like. A particularly suitable rod would be one that is about 5/16 to ½ inch long with a circular cross-section about 25-30 mils (thousandths of an inch) in diameter.

The rod can be partially or completely covered with a coating 12 of electrically conductive material such as platinum, palladium or any other platinum metal or gold. Such a film is readily applied by dipping the rod in a solution of an organic compound of the metal, platinum resinate for example, or a paste of metallic particles dispersed in an organic binder, e.g. platinum powder in an organic resin solution, so that a thin layer of the solution or paste adheres to the rod, then drying and firing the dipped rod. Such metallic solutions or pastes can be made in the manner described in the National Bureau of Standards Miscellaneous Publications No. 192, New Advances in Printed Circuits, pages 25–27. At temperatures of about 1380° F. or higher the paste will deposit finely divided elemental metal particles which will become sintered together to form a fairly continuous film, usually not more than about ½ mil thick.

The metal surface of rod 10 is provided with a high dielectric constant ceramic coating 14, as by dipping in an aqueous suspension of finely divided titanate ceramic particles. It is preferred to have the particles of relatively fine size, that is, smaller than about ½ micron. The particles should accordingly be ground as in a rod or pebble mill for about 10 hours or sufficiently to reduce the particle size to the desired value. The water suspension should have from 25% to about 75% by weight of the ceramic particles. As an alternative to the above aqueous suspensions, organic resin solutions, e.g. polystyrene in toluene, can replace the water.

After dipping, the coated rod is withdrawn, dried at 300° F. and fired. This firing should be at a temperature above 2000° F. and is preferably continued for one to thirty minutes.

Another conductive coating 16 such as a platinum metal deposited from a paste as above is then applied over the coating 14. Film 16 does not extend along the rod far enough to completely cover ceramic coating 14 or project beyond it into engagement with the electrically conductive film 12. For best results an uncoated margin 18 of ceramic coating 14 is provided.

A second high dielectric constant ceramic coating 20 is applied over the conductive film 16. Where there is an unmetallized margin 18, it is desirable for the coating 20 to extend over and cover this margin. A final external layer 22 of electrically conductive material such as a metal film similar to 12 and 16 is then applied around coating 20. For convenience the layer 22 can be extended beyond one edge of coating 20 so that it engages the conductive film 12.

It is preferred to use for the films 12 and 16 a metal having a relatively low degree of diffusibility at the firing temperature to which the layers 14 and 20 are subjected. The platinum metals are particularly suited for this reason. However, the outer layer 22 need not be subjected to such high temperatures and can accordingly be any other metal, silver for example. Silver can be deposited using the standard silver type coating material such as those having finely divided silver mixed with a few percent of glass suspended in a vehicle that is driven off or oxidized away by a final firing step which can be conducted at temperatures as low as 1400° F. or lower. Examples of such silver applying compositions are described in National Bureau of Standards circular 468, entitled Printed Circuit Techniques, pages 5, 6 and 7. The outer film 22 can also be applied by a metal spraying operation as in the well-known Schoop process.

The second dielectric coating 20 is preferably applied in such a way it does not completely cover conductive film 16. One convenient way of effecting this is by predipping the end of the unit, before the application of coating 20, in an adherence-preventing material such as the solution of 5 to 20% polyvinyl alcohol in water. After dipping, the article is withdrawn and will then have a film of the solution at the dipped end. This film is then subjected to a baking operation at 300° F. for example to dry it and leave the dried resin coating on the dipped portion. The article at this point can be then merely dipped into the suspension that provides dielectric coating 20, the dipped coating then extending over the dried resin layer as well as the balance of the article. After drying the dielectric ceramic layer produced by this dip and subjecting to a temperature of about 1400° F., it will be found that the layer adheres quite well to the body except over the margined end. A sharp tapping of the body or a brushing of the margined end, or the like, will cause the ceramic to flake or drop off. The preference for this technique resides in the adaptation of the process to automation for dipping of the coated rod need be done in only one direction.

Any other resins such as polystyrene, polymethyl-methacrylate, and methyl cellulose or other esters and ethers of cellulose, can be used in place of the polyvinyl alcohol.

After the final layer 22 is in place, leads can be attached to the separate terminals formed by the exposed ends of layers 22 and 16. One simple method is to wind the ends of solderable leads such as tinned or untinned copper wire over the exposed coatings for up to 2 or 3 turns or the like, after which the ends can be dipped into molten solder. In order to avoid having the wound ends unduly increase the size of the final assembly, the leads can be made of wires as thin as 10 mils in diameter or even thinner. The leads can also be attached by merely providing them with a terminal loop or otherwise enlarged end, placing the enlarged end against the electrode to which it is to be secured, and then soldering the end in place. In this way the leads can merely be abutted against the electrodes without appreciably increasing the thickness of the coated body.

It is also desirable to keep electrode material away from sharp or abrupt edges, as for example, the end zone 11 of rod 10. Inasmuch as the short rods are very conveniently provided by breaking a longer rod into individual short lengths, the edges will be sharp. Accordingly, any electrode on these edges will develop a strong electrical field. If an oppositely polarized electrode is relatively closely spaced to such sharp electrode edge, then the dielectric between these two locations will be extremely susceptible to early breakdown. In addition, the dielectric coating, if applied by the dip process, for example, usually leads to non-uniformities at such sharp edges.

For the above reasons, where the capacitor is intended for operation at about 100 volts or more, it is desirable to leave a non-conductive margin 13 adjacent the sharp edge. This margin can be provided in the same way as the uncoated margin of electrode 16. Alternatively, conductive film 12 can be applied as by a spraying operation with the spraying limited, as by masking, to the area desired to be coated.

As described in the parent application, the self-supporting body or rod 10 is preferably fired to a temperature at least 50° F. higher than any of the heat treatments used to form the coatings. This rod, as well as coatings 14 and 20, can be made of high dielectric constant titanates or zirconates of the alkaline earth metals either by themselves or in mixtures with each other and with or without supplemental additions of barium stannate, lead stannate or the like. For best results, at least the dielectric coatings 14 and 20 should having dielectric constants of 90 or higher. The ceramics can have their dielectric constant increased by mixing with them a minor amount, up to 30% by weight, of a finely divided (smaller than 50 microns) platinum metal as described in copending Planer et al application, Serial No. 487,214, filed February 9, 1955, now U.S. 2,883,290 issued April 21, 1959. Extremely high dielectric constants, that is, from 1,000–10,000, can be obtained by the additions of minor amounts of certain oxides, e.g. .1% to 10% of $Cb_2O_5$ as taught by the copending McQuarrie et al. applications, Serial No. 399,619, filed December 21, 1953, now abandoned; Serial No. 462,604, filed October 15, 1954, now U.S. 2,855,317, issued October 7, 1958; and Serial No. 487,456, filed February 10, 1955.

Where the firing temperatures are above 2300° F., it is preferred to use palladium, rhodium, iridium and platinum as the only metal ingredients in the portion of the assemblies that are fired. These metals show less diffusion, as well as greater ease of soldering, apparently because the firing causes less oxidation.

The resistivity of the electrodes should not be greater than about 30 ohms per square, although for high current-handling ability or better power factors, resistivities of about 1 ohm per square are preferred. The desired resistivities can usually be obtained wtih a single dip of the metal paste. However, more than one dip coating can be used if desired, with or without firing between steps.

Alternatively, the electrode layers can be formed by spraying the electrode mixture in place.

Correspondingly, the dielectric coatings 14 and 20 can also be formed from a plurality of successive dips. A highly effective dielectric coating can also be formed by electrophoretically depositing the ceramic particles, as for example, in the manner disclosed by S. O. Dorst in U.S. 2,707,703 issued May 3, 1955. The electrophoretic field helps direct depositing particles to portions of the coated surface where the coating is too porous or incomplete. A dielectric coating of somewhat higher breakdown voltage can be obtained in this way.

The completed capacitor can be enveloped with a protective sheath such as a resin coat 24. Any resin such as a melamine-aldehyde, phenol-aldehyde, aniline-aldehyde, epoxy, polytetrafluoroethylene, vinyl toluene copolymers with divinyl benzene can be used, with or without fillers. Ceramic or even wax sheaths can also be used satisfactorily. Where the capacitor does not need such protection, as for example, where it is incorporated in a housing with other components, the protective sheath can be omitted.

A feature of the construction of FIG. 1 is that it provides 150 volt 0.005 microfarad capacitors in a volume scarcely larger than that of the rod 10 itself. For such capacitors the rod can be only 30 mils in diameter and one-half inch long, the completed capacitor being about 40 mils in diameter and as long as the rod. By way of example, a high dielectric constant ceramic rod 28 mils in diameter and $^{11}\!/_{32}$ inch long, coated as in FIG. 1 with platinum films 0.1 mil thick and titanate dielectric layers 3 mils thick and having a dielectric constant of 1200, provides a 150 volt capacitor of 0.004 microfarad, where all the firings are carried out at 2350° F.

Where the leads have a thickness of more than about 5 or 6 mils, they generally so increase the thickness of the capacitor at the lead attachment sites that the two-dielectric construction of the present invention takes up no more space than the one-dielectric construction described in the parent application. In fact the relationship of the dielectric thickness to lead attachment site thickness will sometimes permit a three- or even four-dielectric construction to fit into the same space, thereby even further increasing the capacitance. The extra dielectrics are readily applied by additional dips in the dielectric mixture, and the application of additional metallized coatings. Uncoated margins in the additional dielectric coatings and/or the metallized films can be provided as indicated above. For example, the film 22 can be covered by dipping with another dielectric coat that extends from its left hand edge as seen in FIG. 1, beyond its right hand edge. The dipped end of the assembly can first be covered with an adherence-preventing layer, so that the ceramic coating will be readily removed from the end where a lead is to be attached. An outer metallizing film is then applied to form an additional electrode that extends over and is electrically connected to electrode 14. The electrode sites will accordingly be no larger, although the intermediate section of the capacitor will be only slightly thicker since only 1 to 3 mil dielectric thicknesses are needed.

FIG. 2 shows a modified form of the invention in which a metal rod or wire 30 is used as the self-supporting body of the capacitor. This not only eliminates the need for the central or initial metallized film, but in addition the rod can be extended beyond the coatings so as to supply one of the electrode leads and only one lead-attaching operation is needed. The rod should be one of the thermally resistant metals listed above. It is preferred to have the blind end of the rod rounded or covered with an extra thickness of dielectric to improve the breakdown characteristics at this point. Metallic rods can be more readily made as thin as 3 or 4 mils so that the final capacitor can be made even thinner than that possible with the construction of FIG. 1.

To simplify the manufacturing operations a plurality of the rods used as capacitor supports can be mounted in a single holder somewhat after the manner of bristles on a brush. The entire assembly of rods can then be conveniently subjected to simultaneous dipping and/or firing in a single operation with a minimum of handling. Ceramic type rods are easily fired to a ceramic holder formulated from alumina and ball clay (100:30 by weight).

Inherent in the multi-film ceramic capacitor construction of the invention are advantages beyond substantial increase in capacity per unit volume. With multi-ceramic films wherein each has its particular dielectric characteristics capacitors can be tailored to substantially zero temperature coefficients of capacity over wide temperature ranges and specific capacities. In the temperature coefficient application films of both positive and negative characteristics would be used and for the latter films of different dielectric constants.

The dimensional characteristics of the elongated capacitor of our invention would be most suitable to piezoelectric applications. By use of known piezoelectric formulations, e.g. barium titanate and lead titanate, as the dielectric coating the device upon polarization becomes an excellent omnidirectional piezoelectric structure suitable for a multiplicity of applications, e.g. phonograph pick-up and strain gauge.

An additional variation of the broad concept of the invention as set forth in this and the parent application is a miniature feed-through capacitor. In contrast to the two terminal capacitors considered so far this is a three-terminal structure with one electrode, the inner having lead wires at each end while the outer electrode is strapped or soldered to a grounding flange. To accomplish this the inner electrode need only be modified over that taught to extend beyond the outer electrode at each end.

For adaptation of the concept of the invention to miniature filters and integral resistance-capacitance structures the outer electrode can be of a conducting resistance ink rather than the conducting metal coating previously set forth. Suitable resistance ink formulations include those of the copending Peck et al. application S.N. 288,305 which was filed on May 16, 1952, and later issued on June 11, 1957, as U.S. 2,795,680. A series R-C arrangement can be readily produced by extending the rod 10 of FIG. 1 and imposing on its extended surface a resistance coating terminated by an exterior terminal and the metal surface 12 of rod 10.

As indicated above, it is preferred to have the dielectric particles applied from a suspension made after the particles have been fired to a temperature of at least about 2100° F. Such a prefiring need not effect a sintering together of the individual particles, and whether or not it produces such sintering, it has been found to make a dip coating that is much less likely to show a low breakdown voltage. When this prefiring or precalcining is omitted, about 20% or more of the final products turn out to have a relatively low breakdown voltage.

As many apparently widely different embodiments of the invention may be made without departing from the spirit and scope hereof, it is to be understood the invention is not limited to the specific embodiments hereof except as defined in the appended claim.

What is claimed is:

A multilayer miniature thin film ceramic capacitor comprising an elongated self-supporting ceramic rod of not more than 30 mils cross-section, a diffusion-resistant electrically conductive coating less than ½ mil thick on one end and less than the full length of said rod, a first ceramic layer not more than 5 mils thick covering the other end of said rod and less than the full length of said coating, a film of diffusion-resistant electrically conductive material less than ½ mil thick covering said other end of said rod and less than the full length of said first ceramic layer, a second ceramic layer intermediate the ends of said rod and in contact with said first ceramic layer at the end of said film, a conductive layer overlying said one end of said rod and extending less than the full length of said second ceramic layer, and lead-wires connected to said conductive layer and to said film, respectively.

References Cited in the file of this patent

UNITED STATES PATENTS

| | | |
|---|---|---|
| 2,253,026 | Godsey | Aug. 19, 1941 |
| 2,294,760 | Morris | Sept. 1, 1942 |
| 2,504,178 | Burnham | Apr. 18, 1950 |
| 2,556,257 | Denes | June 12, 1951 |
| 2,585,752 | Dorst | Feb. 12, 1952 |
| 2,604,410 | Bryant | July 22, 1952 |
| 2,759,854 | Kilby | Aug. 21, 1956 |